United States Patent [19]
Schwuchow

[11] 4,129,330
[45] Dec. 12, 1978

[54] UNDERSTRUCTURE OF A SELF-SUPPORTING MOTOR VEHICLE BODY

[75] Inventor: Norbert Schwuchow, Sindelfingen, Germany

[73] Assignee: Daimler-Benz Aktiengesellschaft, Germany

[21] Appl. No.: 696,690

[22] Filed: Jun. 16, 1976

[30] Foreign Application Priority Data

Jun. 19, 1975 [DE] Fed. Rep. of Germany ....... 2527385

[51] Int. Cl.² .............................................. B62D 27/02
[52] U.S. Cl. .................................... 296/28 F; 280/781
[58] Field of Search .................. 296/28 F, 28 J, 28 K, 296/28 R; 280/106 R

[56] References Cited

U.S. PATENT DOCUMENTS

| | | | |
|---|---|---|---|
| 2,833,589 | 5/1958 | Ahrens | 296/28 R |
| 2,964,331 | 12/1960 | Sherman | 296/28 F |
| 2,991,115 | 7/1961 | Wilfert | 280/106 R |
| 3,108,836 | 10/1963 | Deckert | 296/28 F |
| 3,149,856 | 9/1964 | Schilberg | 296/28 F |
| 3,423,122 | 1/1969 | Wessells | 296/28 F |
| 3,614,124 | 10/1971 | Schwabenlender | 280/106 R |
| 3,791,472 | 2/1974 | Tatsumi | 296/28 F |

FOREIGN PATENT DOCUMENTS 1074416  1/1960  Fed. Rep. of Germany ......... 296/28 F Primary Examiner—Joseph F. Peters, Jr.
Assistant Examiner—John A. Carroll
Attorney, Agent, or Firm—Craig & Antonelli

[57] ABSTRACT

An understructure of a self-supporting motor vehicle body which includes two forward longitudinal bearers extending initially approximately parallel to the vehicle longitudinal direction at a distance from one another which are connected with the outside of the end wall continuing as main floor, extend at their vehicle inner ends outwardly in the direction toward two outer longitudinal bearers and are supported at the latter; the longitudinal bearer thereby forms a profile section of the outer longitudinal bearer within the connecting area of the longitudinal bearer and of the outer longitudinal bearer.

10 Claims, 8 Drawing Figures

FIG I
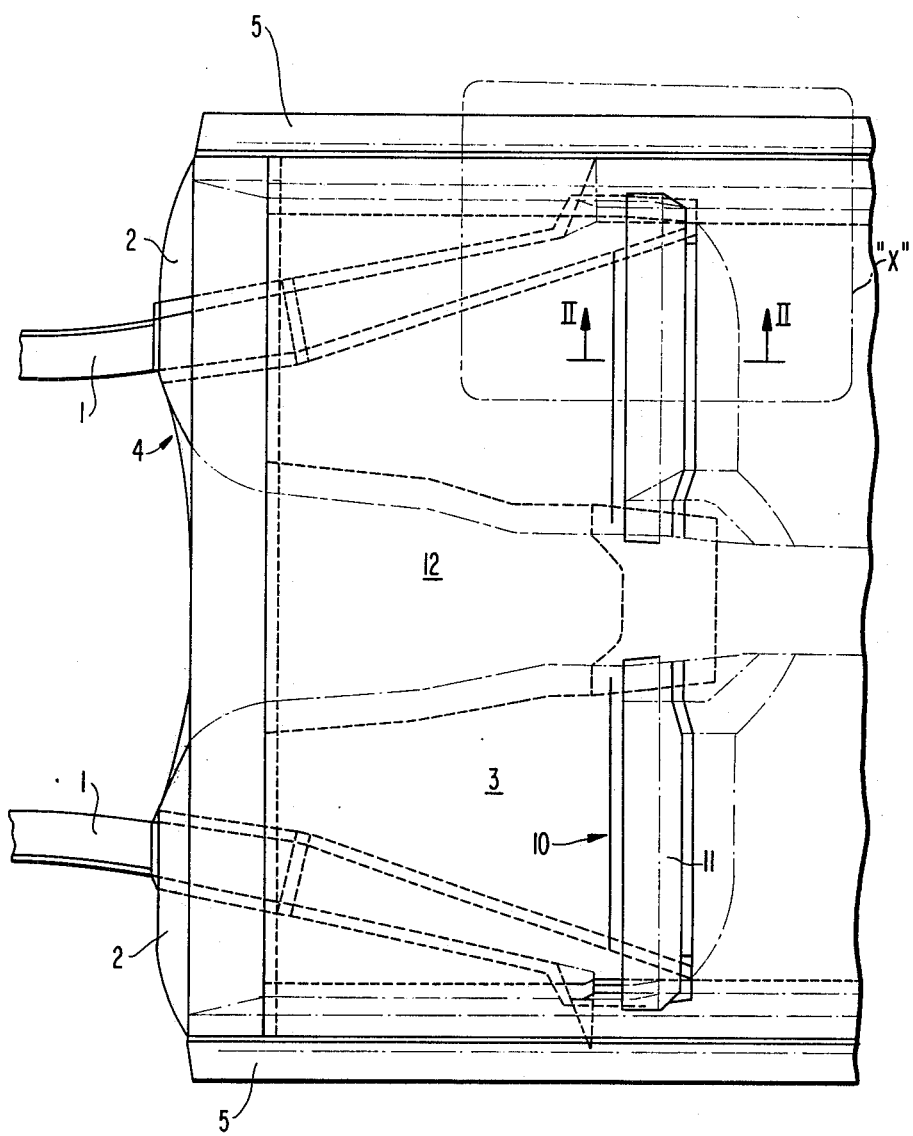
FIG 2
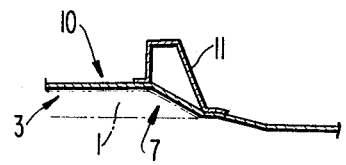

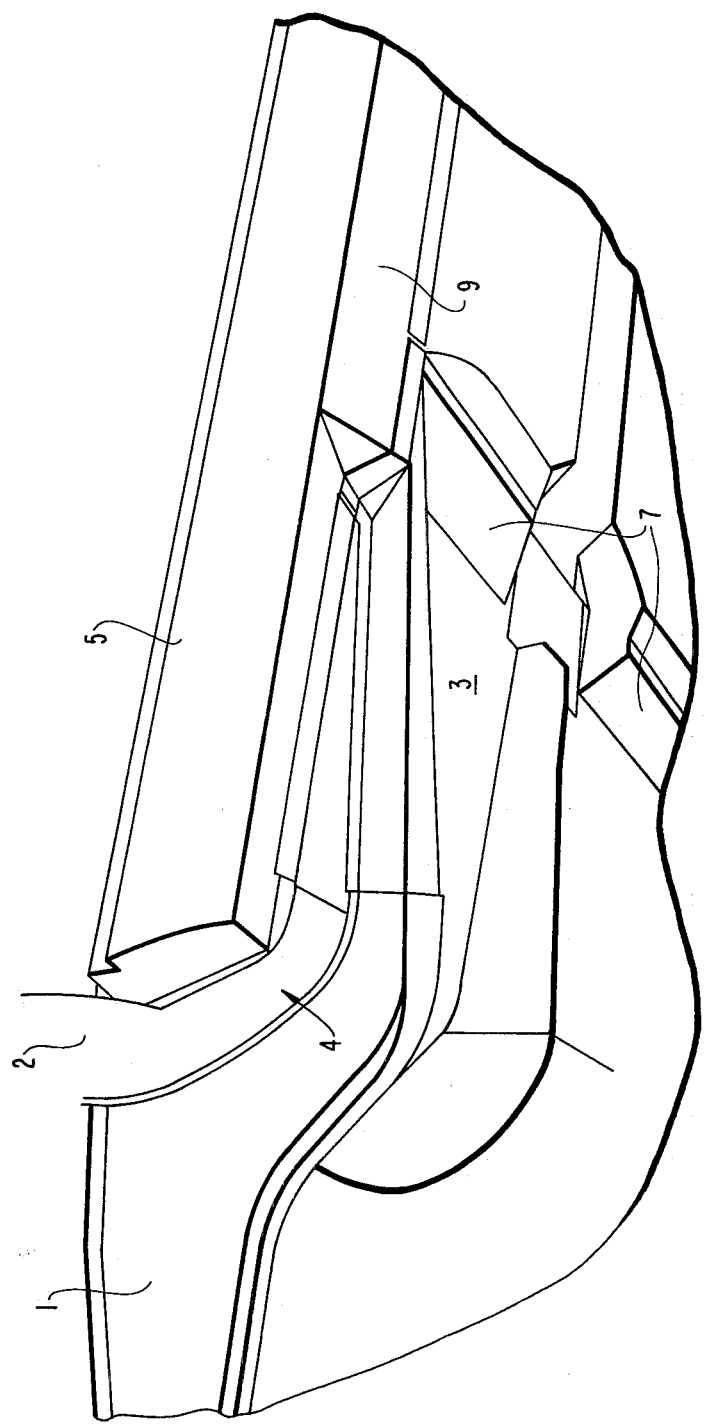

UNDERSTRUCTURE OF A SELF-SUPPORTING MOTOR VEHICLE BODY

The present invention relates to an understructure of a self-supporting motor vehicle body which includes two forward longitudinal bearers initially extending approximately parallel to the vehicle longitudinal direction at a distance from one another, which are connected with the outside of the end wall continuing as main floor, extend at the inner ends thereof outwardly in the direction toward outer longitudinal bearers and are supported at the latter.

Such a self-supporting understructure of a motor vehicle body which is disclosed, for example, in the German Offenlegungsschrift No. 2,145,467, serves the purpose to be able to reliably absorb the forces occurring during driving operation and those occurring in case of impact, without leading to deformation appearances at parts of the passenger cell. However, difficulties always still occur as regards form-rigidity within the transition area from front section to passenger cell. On the other hand, this area is to be constructed as bending-and torsional-rigid as possible, on the other, precisely in that area a weight or structural part concentration is to be avoided.

It is the aim of the present invention to provide an approach circumventing disadvantageous measures which makes it possible to reinforce permanently and lastingly the transition area from the end section to the passenger cell in a simple manner.

Consequently, an understructure of a self-supporting motor vehicle body is proposed which includes two forward longitudinal bearers initially extending approximately parallel to the vehicle longitudinal direction at a distance from one another, which are connected with the outside of the end wall continuing as main floor, extend at the end thereof outwardly in the direction toward two outer longitudinal bearers and are supported at the latter whereby according to the present invention, the longitudinal bearer forms a profile section of the outer longitudinal bearer within the connecting area of longitudinal bearer and outer longitudinal bearer.

In one preferred embodiment of the present invention, the main floor includes within the connecting area of the longitudinal bearer and of the outer longitudinal bearer a step or groove extending in the vehicle transverse direction. As a result thereof, the mentioned area receives an additional reinforcement. Simultaneously therewith, also an improved air guidance can be achieved by a corresponding construction of the step or groove.

It is also of advantage if the end portion of the longitudinal bearer together with the main floor forms a nearly flat surface which extends rising in the direction of the outer area of the outer longitudinal bearer.

A further reinforcement in the vehicle transverse direction is made possible if the top side of the main floor receives within the connecting area of the longitudinal bearer and of the outer longitudinal bearer, a cross bearer supported at the outer longitudinal bearer.

Accordingly, it is an object of the present invention to provide an understructure of a self-supporting motor vehicle body which avoids by simple means the aforementioned shortcomings and drawbacks encountered in the prior art.

Another object of the present invention resides in an understructure of a self-supporting motor vehicle body which resolves problems encountered in the transition area from the end section to the passenger cell as regards rigidity and clean lines of structure.

A further object of the present invention resides in an understructure of a self-supporting motor vehicle body which effectively resolves the contradictory requirements for a construction which, on the one hand, is to be as rigid in bending and torsion yet is to avoid a concentration of weight and structural parts.

Still another object of the present invention resides in an understructure of a self-supporting motor vehicle body which enables a meaningful reinforcement of the transition area from the end section to the passenger cell by extremely simple means.

A further object of the present invention resides in an understructure of a self-supporting motor vehicle body which is also favorable from a streamlining point of view.

These and other objects, features and advantages of the present invention will become more apparent from the following description when taken in connection with the accompanying drawing which shows, for purposes of illustration only, one embodiment in accordance with the present invention, and wherein:

FIG. 1 is a simplified plan view on an understructure area of a self-supporting motor vehicle body constructed in accordance with the present invention;

FIG. 2 is a cross-sectional view taken along line II—II in FIG. 1;

Figure 3:
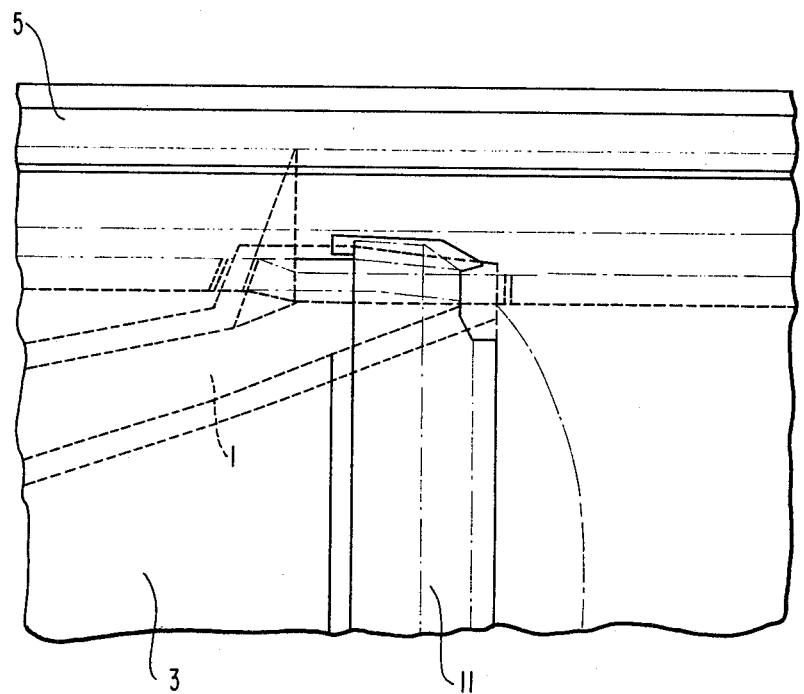
FIG. 3 is a partial plan view, on an enlarged scale, illustrating the area indicated by reference character "X" in FIG. 1.
Figure 4:
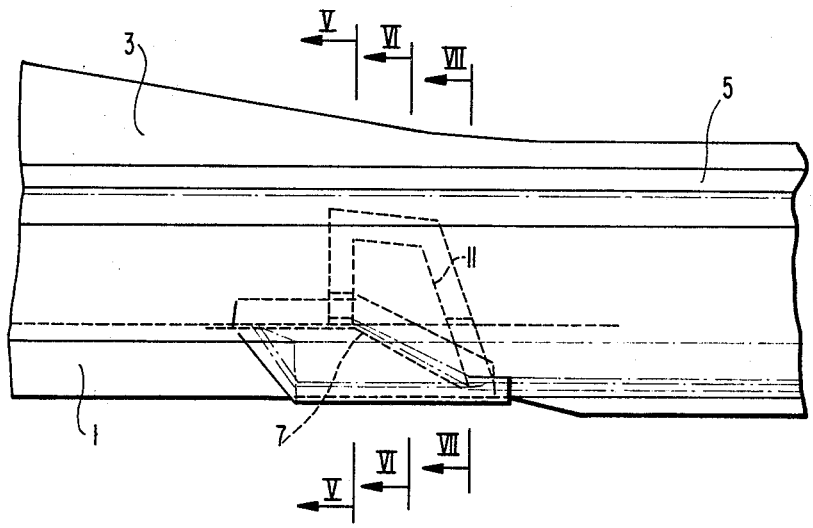
FIG. 4 is a side elevational view of the parts illustrated in FIG. 3.
Figure 5:
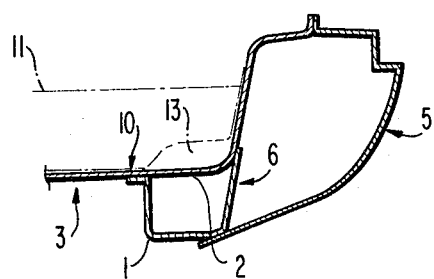
Figure 6:
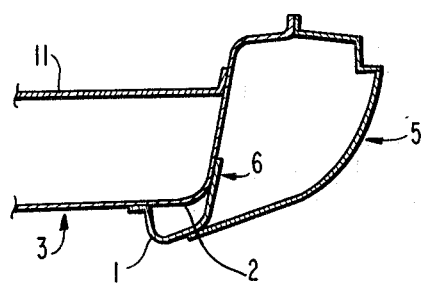
Figure 7:
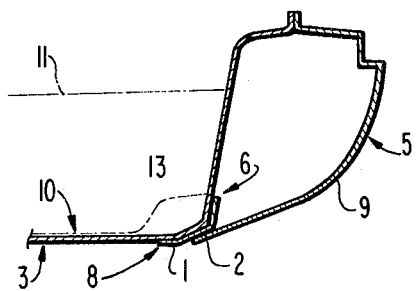

FIGS. 5, 6, and 7 are somewhat schematic cross-sectional views taken along lines V—V, VI—VI and VII—VII of FIG. 4; and FIG. 8 is a partial perspective bottom view of the area illustrated in FIG. 1.

Referring now to the drawing wherein like reference numerals are used throughout the various views to designate like parts, two forward longitudinal bearers 1 which initially extend approximately parallel to the vehicle longitudinal direction at a distance from one another, are securely connected with the outside 2 of the end wall generally designated by reference numeral 4 which continues as main floor 3. In the end areas facing the passenger cell, the longitudinal bearers 1 extend in the direction toward two outer longitudinal bearers 5 at which the longitudinal bearers 1 are supported. The longitudinal bearer 1 is so incorporated into the transfer joint within each connecting area of a longitudinal bearer 1 which may consist of several sections, with the outer longitudinal bearer 5 that it forms a profile section generally designated by reference numeral 6 of the outer longitudinal bearer 5 as can be seen in particular from FIGS. 5 to 7. The heretofore customary hinge-like connection is circumvented by the type of connection in accordance with the present invention of the longitudinal bearers 1 with the outer longitudinal bearers 5, in which the hollow spaces of both bearers extend adjacent one another over a predetermined distance.

As can be seen particularly well from FIGS. 2, 4, and 8, the main floor 3 includes within the connecting area of longitudinal bearers 1 and of the outer longitudinal bearers 5, a step 7 with a transition that drops down toward the rear. As a result thereof, an additional reinforcement is achieved and an area favorable from a streamlining point of view is created at the same time. In the consequential, further development of the inventive concept to create a vehicle bottom surface which is as non-fragmented as possible, the end portion of the longitudinal bearer 1 forms together with the main floor 3 a nearly flat surface 8 (FIG. 7) which then extends rising in the direction of the outer area 9 of the outer longitudinal bearers 5.

A two-partite cross bearer 11 mounted on the top side 10 of the main floor 3 is supported, on the one hand, at the outer longitudinal bearers 5 and, on the other, at the tunnel area 12 (FIG. 1)—which projects from the main floor 3 and which is not illustrated in detail. As a result thereof, the transfer joint becomes particularly resistant against the forces which occur in case of a lateral impact. As can be seen in particular from FIGS. 5 and 6, the legs and the spot-welding flanges of the cross bearer 11 which serve the fastening purpose, are provided within their connecting area with apertures 13 for extending therethrough lines and cables. A reduction of the strength and rigidity, however, does not take place by reason of the reinforcing effect of the longitudinal bearers 1.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An understructure of a self-supporting motor vehicle body, which comprises two longitudinal bearer means initially extending approximately parallel to the vehicle longitudinal direction at a distance from one another, said longitudinal bearer means being connected with the outside of an end wall of said vehicle body, said longitudinal bearer means extending at their inner ends outwardly in the direction toward two outer longitudinal bearers and being directly connected to said outer longitudinal bearers, characterized in that a wall section of the longitudinal bearer means forms a wall section of the periphery of the outer longitudinal bearer as viewed in transverse cross-section within the area of the connection of the longitudinal bearer means and of the outer longitudinal bearer.

2. An understructure according to claim 1, characterized in that the end wall continues as a main floor of said vehicle body.

3. An understructure according to claim 1, wherein the connection of said longitudinal bearer means to said outer longitudinal bearer means is at said inner ends of the longitudinal bearer means, and said longitudinal bearer means and said outer bearer means are interconnected solely in said area of the connection.

4. An understructure according to claim 1, characterized in that a main floor is provided within the connecting area of the longitudinal bearer means and of the outer longitudinal bearer with a groove extending in the vehicle transverse direction.

5. An understructure according to claim 1, characterized in that an end portion of the longitudinal bearer means together with a main floor forms a nearly flat surface which extends rising in the direction toward an outer area of the outer longitudinal bearer.

6. An understructure according to claim 2, characterized in that a top side of the main floor receives a cross bearer supported at the outer longitudinal bearers within the connecting area of the longitudinal bearer means and of the outer longitudinal bearer.

7. An understructure according to claim 6, characterized in that an end portion of the longitudinal bearer means together with the main floor forms a nearly flat surface which extends rising in the direction toward the outer area of the outer longitudinal bearer.

8. An understructure according to claim 7, characterized in that the main floor is provided within the connecting area of the longitudinal bearer means and of the outer longitudinal bearer with a step extending in the vehicle transverse direction.

9. An understructure according to claim 7, characterized in that the main floor is provided within the connecting area of the longitudinal bearer means and of the outer longitudinal bearer with a groove extending in the vehicle transverse direction.

10. An understructure according to claim 1, wherein said connection is at said inner ends of the longitudinal bearer means, and said longitudinal bearer means and said outer longitudinal bearer means are interconnected solely in said area of the connection.

* * * * *